US009582265B2

(12) United States Patent
Marr, Jr. et al.

(10) Patent No.: US 9,582,265 B2
(45) Date of Patent: Feb. 28, 2017

(54) RUNTIME CREATION, ASSIGNMENT, DEPLOYMENT AND UPDATING OF ARBITRARY RADIO WAVEFORM TECHNIQUES FOR A RADIO WAVEFORM GENERATION DEVICE

(71) Applicant: Raytheon Company, Waltham, MA (US)

(72) Inventors: Harry B. Marr, Jr., Manhattan Beach, CA (US); Daniel Thompson, Hermosa Beach, CA (US); William B. Noble, Santa Monica, CA (US); Paul Yue, Granada Hills, CA (US); Steven G. Danielson, Playa Del Rey, CA (US); Julia Karl, Redondo Beach, CA (US); Larisa Angelique Natalya Stephan, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/049,801

(22) Filed: Feb. 22, 2016

(65) Prior Publication Data

US 2016/0210138 A1 Jul. 21, 2016

Related U.S. Application Data

(62) Division of application No. 13/929,116, filed on Jun. 27, 2013, now Pat. No. 9,268,551.

(51) Int. Cl.
*H04L 27/00* (2006.01)
*G06F 9/445* (2006.01)
*G06F 17/50* (2006.01)

(52) U.S. Cl.
CPC ............ *G06F 8/65* (2013.01); *G06F 17/5054* (2013.01)

(58) Field of Classification Search
None
See application file for complete search history.

(56) References Cited

U.S. PATENT DOCUMENTS 6,032,111 A * 2/2000 Mohri ................. G06F 17/2755
704/257
7,797,664 B2 9/2010 Matsumoto et al.
(Continued)

FOREIGN PATENT DOCUMENTS

CN 202261305 U 5/2012
CN 202794534 U 3/2013
(Continued)

OTHER PUBLICATIONS

"Taiwanese Application Serial No. 103114368, Office Action mailed Mar. 21, 2016", 6 pgs.
(Continued)

*Primary Examiner* — Tesfaldet Bocure
(74) *Attorney, Agent, or Firm* — Schwegman Lundberg & Woessner, P.A.

(57) ABSTRACT

A system includes a library of elements to create a model describing a waveform parameter technique. A constraint checker verifies that the created model is correct by construction by needing no verification after compilation. The constraint checker also implements a valid programmable device build according to the waveform parameter technique. A placement decision module receives the verified models produces a placement decision for placing the waveform parameter technique based on the verified model in a programmable device. A synthesis tool receives the verified model from the placement decision module and synthesizes the waveform parameter technique based on the verified model. A link/loader receives the placement decision from the placement decision module and receives the synthesized technique from the synthesis tool. The link/loader also
(Continued)

places the waveform parameter technique in the programmable device according to the placement decision.

14 Claims, 13 Drawing Sheets

(56) References Cited

U.S. PATENT DOCUMENTS

| | | |
|---|---|---|
| 9,268,551 B2 | 2/2016 | Marr et al. |
| 2008/0003949 A1 | 1/2008 | Voonna et al. |
| 2009/0153188 A1 | 6/2009 | Vorbach et al. |
| 2010/0063791 A1 | 3/2010 | Wen et al. |
| 2010/0227572 A1 | 9/2010 | Foag |
| 2015/0007158 A1 | 1/2015 | Marr et al. |

FOREIGN PATENT DOCUMENTS

| | | |
|---|---|---|
| TW | 200805998 A | 1/2008 |
| TW | 201511486 A | 3/2015 |
| WO | WO-2014210143 A2 | 12/2014 |

OTHER PUBLICATIONS

Bialkowski, Konstanty S, et al., "Design of MIMO Testbed with an FPGA Board for Fast Signal Processing", University of Queensland, School of Information Technology, (Mar. 12, 2007), 8 pgs.

Uthansakul. Peerapong, et al., "Assessing an FPGA Implemented MIMO Testbed With the Use of Channel Emulator", Microwaves, Radar & Wireless Communications 2006, (May 22-24, 2006), 5 pgs.

"U.S. Appl. No. 13/929,116, Ex Parte Quayle Action mailed Sep. 18, 2015", 5 pgs.

"U.S. Appl. No. 13/929,116, Non Final Office Action mailed Apr. 10, 2015", 10 pgs.

"U.S. Appl. No. 13/929,116, Notice of Allowance mailed Oct. 23, 2015", 8 pgs.

"U.S. Appl. No. 13/929,116, Preliminary Amendment filed Jan. 29, 2015", 10 pgs.

"U.S. Appl. No. 13/929,116, Response filed Mar. 31, 2015 to Restriction Requirement mailed Mar. 12, 2015", 7 pgs.

"U.S. Appl. No. 13/929,116, Response filed Jul. 9, 2015 to Non Final Action mailed Apr. 10, 2015", 11 pgs.

"U.S. Appl. No. 13/929,116, Restriction Requirement mailed Mar. 12, 2015", 6 pgs.

"Australian Application Serial No. 2014302524, First Examiner Report mailed Mar. 30, 2016", 5 pgs.

"International Application Serial No. PCT/US2014/044078, Declaration of Non-Establishment of International Search Report mailed Sep. 30, 2014", 3 pgs.

"International Application Serial No. PCT/US2014/044078, Written Opinion mailed Sep. 30, 2014", 6 pgs.

He, K, et al., "Dynamic Reconfiguration Technologies Based on FPGA in Software Defined Radio System", Journal of Signal Processing Systems, vol. 69, Issue 1, (Oct. 2012), 75-85.

Horta Edson L. et al., "Dynamic Hardware Plugins in an FPGA with Partial Run-Time Reconfiguration", Proceedings. 39th Design Automation Conference (DAC 2002), Jun. 10-14, 2002, New Orleans, LA, (2002), 343-348.

Said, K A, "PicoRF: A PC-based SDR Platform using a High Performance PCIe Plug-in Card Extension", Master of Science Thesis, Faculty of the Virginia Polytechnic Institute and State University, Virginia, Jun. 22, 2012, 156 pgs.

Sedcole, P., et al., "Modular dynamic reconfiguration in Virtex FPGAs", IEE Proc.—Comput. Digit. Tech., 153(3), (May 2006), 157-164.

Suarez-Casal, P, et al., "A Multicore SDR Architecture for Reconfigurable WiMAX Downlink", 13th Euromicro Conference on Digital System Design: Architectures, Methods and Tools (DSD), Lille, (Sep. 1, 2010), 801-804.

"Taiwanese Application Serial No. 103114368, Response filed Jun. 14, 2016 to Office Action mailed Mar. 21, 2016", with English translation of claims, 12 pgs.

"European Application Serial No. 14740102.0, Communication Pursuant to Article 94(3) EPC mailed Dec. 8, 2016", 8 pgs.

Gholamipour, A H, et al., "Seamless sequence of software defined radio designs through hardware reconfigurability of FPGAs", Computer Design, IEEE International Conference ON, (Oct. 12, 2008), 260-265 pgs.

Guevara, Maria Katrina D, et al., "Physical layer implementation of orthogonal frequency division multiplexing for software defined radio on FPGA", IEEE Region 10 Conference, (Nov. 19, 2012), 1-4 pgs.

Nychis, George, et al., "Enabling MAC Protocol Implementations on Software-defined Radios", Carnegie Mellon University, (Apr. 23, 2009), 1-24 pgs.

Nychis, George, et al., "Enabling MAC Protocol Implementations on Software-Defined Radios", NSDI '09: 6th USENIX Symposium on Networked Systems Design and Implementation, (Apr. 2, 2009), 91-105.

Schelle, Graham, et al., "A Software Defined Radio Application Utilizing Modern FPGAs and NoC Interconnects", Field Programmable Logic and Applications, International Conference ON, IEEE, PI, (Aug. 1, 2007), 177-182 pgs.

\* cited by examiner

RUNTIME CREATION, ASSIGNMENT, DEPLOYMENT AND UPDATING OF ARBITRARY RADIO WAVEFORM TECHNIQUES FOR A RADIO WAVEFORM GENERATION DEVICE

CLAIM OF PRIORITY

This patent application is a divisional of U.S. patent application Ser. No. 13/929,116 entitled "RUNTIME CREATION ASSIGNMENT, DEPLOYMENT AND UPDATING OF ARBITRARY RADIO WAVEFORM TECHNIQUES FOR A RADIO WAVEFORM GENERATION DEVICE" filed Jun. 27, 2013, issued on Feb. 23, 2016 as U.S. Pat. No. 9,268,551, the entire contents of which are hereby incorporated in its entirety.

BACKGROUND

In currently existing software defined radio (ES) product roadmaps, hardware is reconfigured, e.g. a field programmable gate array (FPGA) device, into circuits used to generate and receive waveforms. This may be accomplished before compiling. Often, there are more waveform circuits that may be used for a given mission than can fit in the given reconfigurable hardware. Further, during a campaign, new capabilities may be used and the ability to update a technique generator, where a technique defines a waveform with frequency, phase, and amplitude parameters as a function of time to add and remove capabilities may be performed. The hardware may be dynamically reconfigured to "swap" out waveform circuits during run-time.

Currently, waveform technique development takes weeks to months, wherein verification alone can take weeks. This is because techniques are currently monolithic and are not designed as independently operating modules where multiple techniques access the same resources. Moreover, there are occasionally more waveform circuits that may be used for a given mission than can fit in the given reconfigurable hardware.

Many methods exist that provide for partial reconfiguration approaches as well as dynamic, e.g., during runtime, reconfiguration approaches. Other dynamic reconfiguration approaches exhaustively compile a new version of a technique for each possible location the technique would be used on a FPGA. Still other dynamic reconfiguration approaches are verified such that the FPGA build is verified for the possible permutations,

DETAILED DESCRIPTION

The following description and the drawings illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

Waveform assignment may be made without waveform generation hardware, e.g., FPGA programming. To perform the assignment ahead of time, assignments are arranged to be dynamically re-configured and re-programmed onto an FPGA device while other hardware channels are still operating, e.g., transmitting. Furthermore, the radio waveforms need not even be known ahead of time, thus the techniques may be created on the fly. An FPGA architecture, a structure of a technique and a way to program an arbitrary technique are provided such that space is allocated on an FPGA ahead of time, which enables the FPGA architecture to receive a list of frequencies as a function of time dynamically. The list is interpreted to create an arbitrary waveform that is updateable in real time.

Thus, the frequencies/modulations/protocols of the waveform itself need not be designed and known prior to releasing the device with the FPGA to the field, such that even the assigned technique itself is implemented in up to real time. The FPGA infrastructure provide for linkable behavioral modules. Modules can be created independently of one another thereby greatly simplifying the previous monolithic process. Further, the module designer does not have to know the module location or resource linking ahead of time. The problem of not knowing parameters ahead of time is overcome by providing an indirect memory architecture for the modules. The correct-by-construction approach, defined as a waveform needing no further verification after compilation, ensures that the designer verifies that a designed module has met a pre-defined set of resource and timing constraints. Further verification outside of the module need not be performed.

Figure 1:
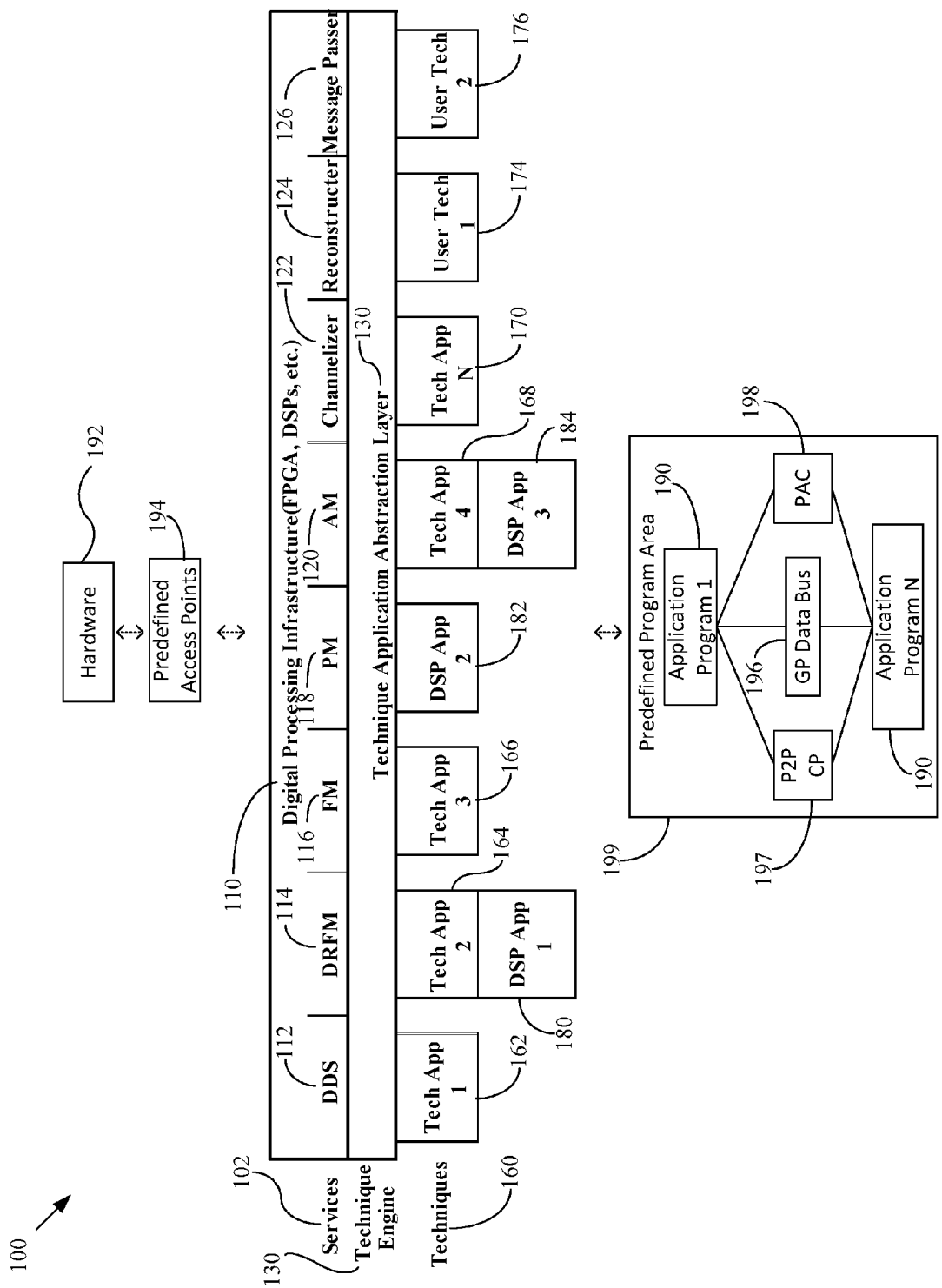
FIG. 1 illustrates an application programming interface (API) for the FPGA waveform generation infrastructure according to an embodiment.

FIG. 1 illustrates an application programming interface (API) 100 for the FPGA waveform infrastructure according to an embodiment. The waveform infrastructure provides basic low level services that enable radio waveform techniques. In FIG. 1, a plurality of digital processing infrastructure types 110 may be used. FIG. 1 shows services 102 for a direct digital synthesizer (DDS) 112, a Digital RF Memory (DRFM) 114, a frequency modulated (FM) modulator 116, a phase modulated (PM) modulator 118, an amplitude modulated (AM) modulator 120, a channelizer 122, a reconstructer 124 and a message passer 126. Below the services is the technique application abstraction layer 130 that supports the technique engine 130. A plurality of techniques 160 are shown below the technique application layer 130. Technique applications 1-N 162-170 are provided. User techniques 1-2 174, 176 are also shown. In addition, digital signal processing (DSP) applications 1-3 180, 182, 184 are also shown.

Thus, the technique applications 162-170 may access the services 102, and the services 102 may exist in the FPGA build whether deployed techniques are currently using them or not. Services 102, such as a DDS service 112, produce a waveform based on a list of provided frequency data, and modulators, such as pulse modulation (PM) 118 and amplitude modulation (AM) 120. Wideband techniques may use a channelizer 122 and an inverse channelizer, e.g., reconstructer 124, to separate a message thread into distinct sub-channels and to reconstructs the input data stream using reconstructed segmented signals to form the original wideband digitized data. Accordingly, technique applications 162-170 may use an FPGA, a DSP, or FPGA's and DSP's, or multiples of each.

The technique abstraction layer 130 is much like an operating system in a software system. The digital processing infrastructure 110 isolates application programs 190 from the underlying hardware, provides inter-process communications and provides inter-process isolation. Isolation of the application programs 190 from the underlying hardware is provided by predefined access points 194 for input and output (I/O) for specific hardware 192, e.g., such as ports that go to a digital-to-analog converter (DAC), and services, such as a system time counter.

Interprocess communications is provided through three services. A general purpose data bus 196 provides communication by any application to any other application. The general purpose data bus 196 provides point-to-point configurable path 197, e.g., a preset number of these paths, as well as an adjacent program area connection 198.

Interprocess isolation is provided by predefined program areas 199 into which an application program 190 may be inserted. An application program 190 occupies one or more program areas 199. These program areas 199 may be constrained as adjacent program areas, e.g., for fastest interprocess communications, such that the fewest amount of logic, gates, or physical wire must be transgressed, or may not be constrained. This isolation ensures that the actions of an application program 190 executing in one program area 199 does not affect an independent program executing in another program area.

Figure 2:
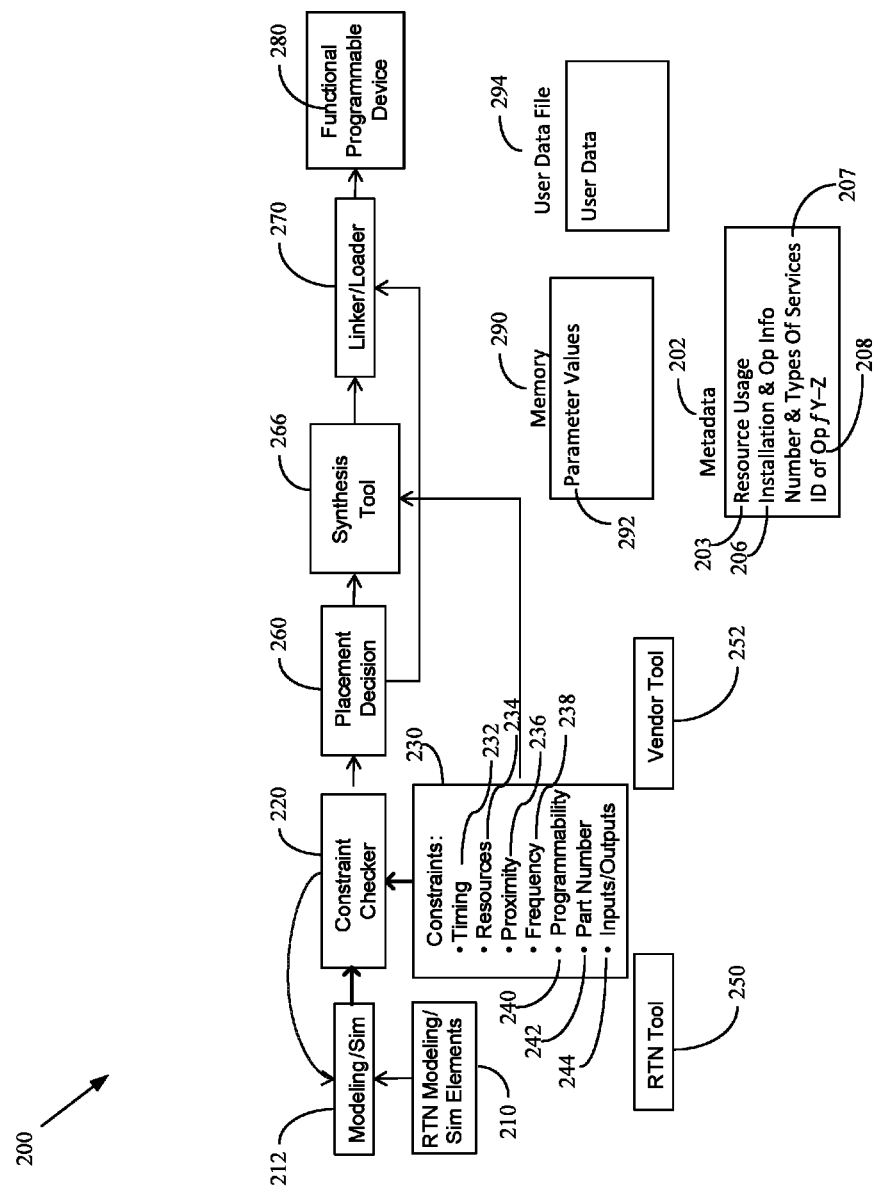
FIG. 2 illustrates a dynamic reconfigurable FPGA design flow according to an embodiment.

FIG. 2 illustrates a dynamic reconfigurable FPGA design flow 200 according to an embodiment. To build new techniques, a library of elements 210 may be provided to a modeling/simulation module 212, e.g., Matlab, for the user to create and test custom models for technique development. Constraint checker 220 verifies that new model is correct by construction and will result in a valid build, where the compiled model conforms to constraints provided by the tool, for a programmable device, e.g., a field programmable gate array (FPGA). Constraints 230 may include timing 232, resources 234, proximity 236, frequency 238, programmability 240, device type (part number) 242, input/outputs 244, etc. A rapid technique generator (RTG) tool 250 and vendor tool 252 may be provided to create a library of technique modules for building the technique. A placement decision module 260 receives the new model for deciding on placement of the new model. The placement decision module 260 provides a verified technique to a synthesis tool 266 and provides a placement decision to a Link/Loader 270. The synthesis tool 266 is used to translate an algorithm description, coded through a graphical schematic, or text, into machine understandable code. The constraints 230 may also be provided to the synthesis tool 266. The Linker/Loader 270 places the new technique into the proper location on the FPGA 280.

Metadata 202 from the library of elements 210 is provided for a dynamic technique. The metadata 202 defines what the technique will do and how the technique will accomplish its task. Metadata 202 may include resource usage 203, e.g., X number of gates, W number of interconnects, installation and operation information 206, number and types of services used 207, e.g., a digital-to-analog converter (DAC) service, and identification of operation frequencies Y-Z 208. Blocks of programmable device 280 are pre-allocated for compatible techniques to dynamically switch in and out, and the technique has parameter descriptors. A memory 290 is provided to store parameter values 292, and techniques access parameter values 292 from memory 290. The user data file 294 loads the parameter values 292 into the locations of the memory 290. The FPGA architecture 280 has ability to handle higher level functionality according to the metadata 202.

Figure 3:
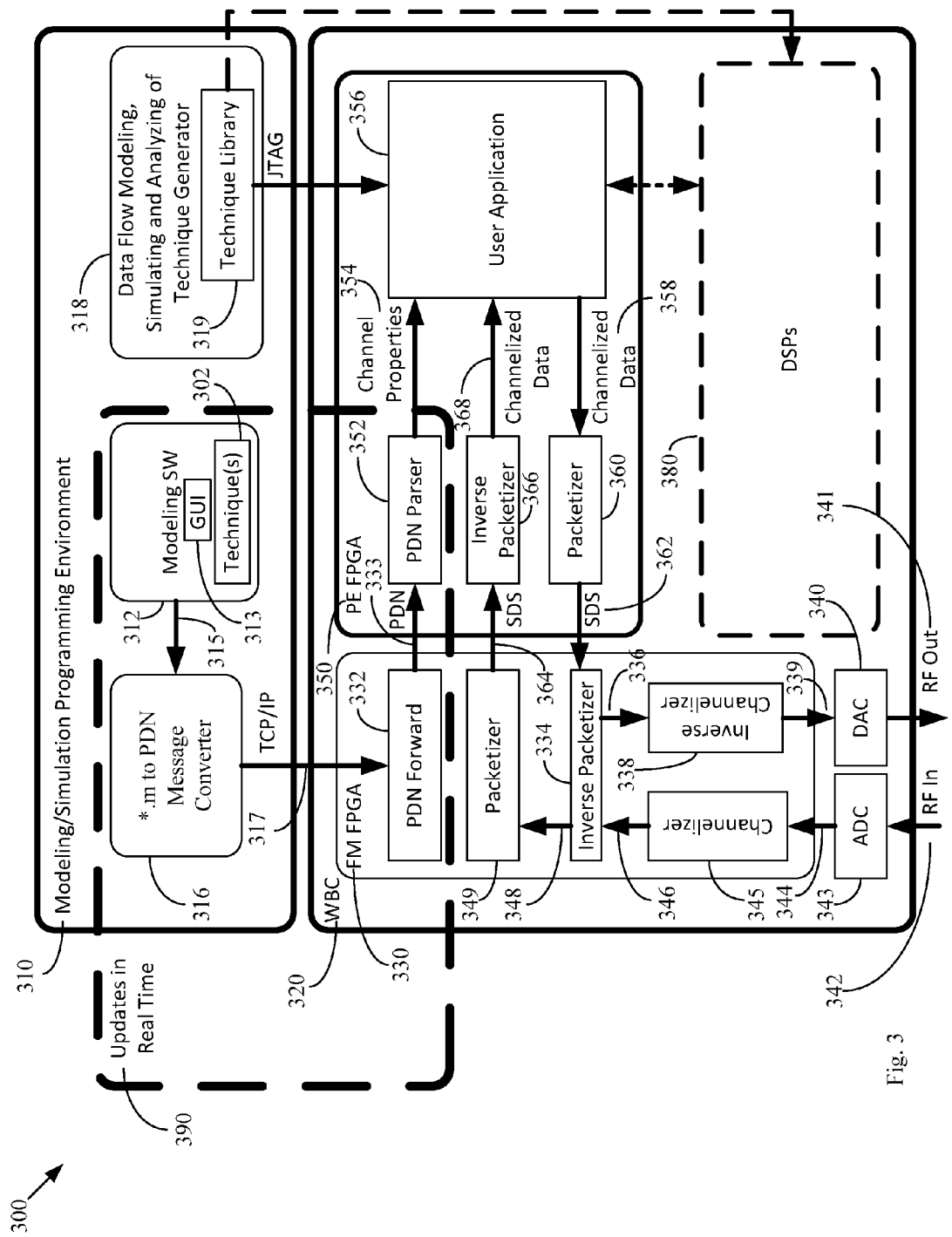
FIG. 3 illustrates a block diagram of a simplified FPGA architecture for providing runtime creation, assignment, deployment and updating of arbitrary radio waveform techniques for a waveform generation device according to an embodiment.

FIG. 3 illustrates a block diagram of a simplified FPGA architecture 300 for providing runtime creation, assignment, deployment and updating of arbitrary radio waveform techniques for a radio waveform device according to an embodiment. According to the block diagram shown in FIG. 3, techniques 302 may be composed at a high level in a development environment independent of the targeted hardware including graphical programming environment 310, e.g., Simulink, or in a text-based programming environment and may be compiled into low level code by using modeling module 312, e.g., MATLAB. A graphical user interface (GUI) 313 may be used to direct the modeling of the techniques 302. The technique models 315 are sent to a converter 316 where the technique files 317 are created and are sent to the reconfigurable processing device, an FM FPGA 330 in the wideband channel module 320. A packet data network (PDN) forward 332 sends the techniques 333 to a parser 352 in a PE FPGA 350 that generates waveform data, e.g., channelized data is generated in this embodiment. Those skilled in the art will recognize that the channelizer is merely an example of an implementation according to one embodiment, but that the channelizer is not necessary. The parser 352 provides channel properties 354 to a user application 356. Techniques may also be provided to the user application 356 from a technique library 319 provided by a technique generator 318. Channelized data 358 is provided to a packetizer 360 that forms data into packets, or bundled units, according to a predetermined protocol and provides packetized channelized data 362 to an inverse packetizer 334 in the FM FPGA 330. The inverse packetizer 334 split the incoming packets according to destination modules and outputs the split results as parameters of the techniques 336 to a circuit that converts that parameters to RF signals, consisting of an inverse channelizer 338 in this embodiment, wherein the output 339 of the inverse channelizer 338 is then converted to RF signals 341 at a digital-to-analog converter (DAC) 340. Those skilled in the art will recognize that the channelizer 345 and inverse channelizer 338 are merely an example of an implementation according to one embodiment, but that the channelizer 345 and the inverse channelizer 338 are not necessary to all embodiments. Received RE signals 342 are converted to digital signals at the analog-to-digital converter (ADC) 343, wherein the digital signals 344 are then provided to a channelizer 345. Channelized data 346 is provided to an inverse packetizer 334 that provides packets 348 to a packetizer 349. The packetizer 349 sends a packetized channelized data 364 to an inverse packetizer 366. The channelized data 368 is then provided to the user application 356 for processing. Digital signal processors 380 may update the waveform techniques and properties, e.g., frequency, bandwidth, Pulse Repetition Time (PRT), etc., in real time.

Accordingly, techniques may be composed at a high level n a simulation graphical programming environment 312, e.g., Simulink, and may be compiled into low level code by using modeling module 316, e.g., Matlab. DSP programming 380 may be included. Technique modeling 312, conversion 316, PDN forwarding 332 and PDN parsing 352 may be updated during runtime while other portions of the FPGA device continue to operate 390.

Figure 4:
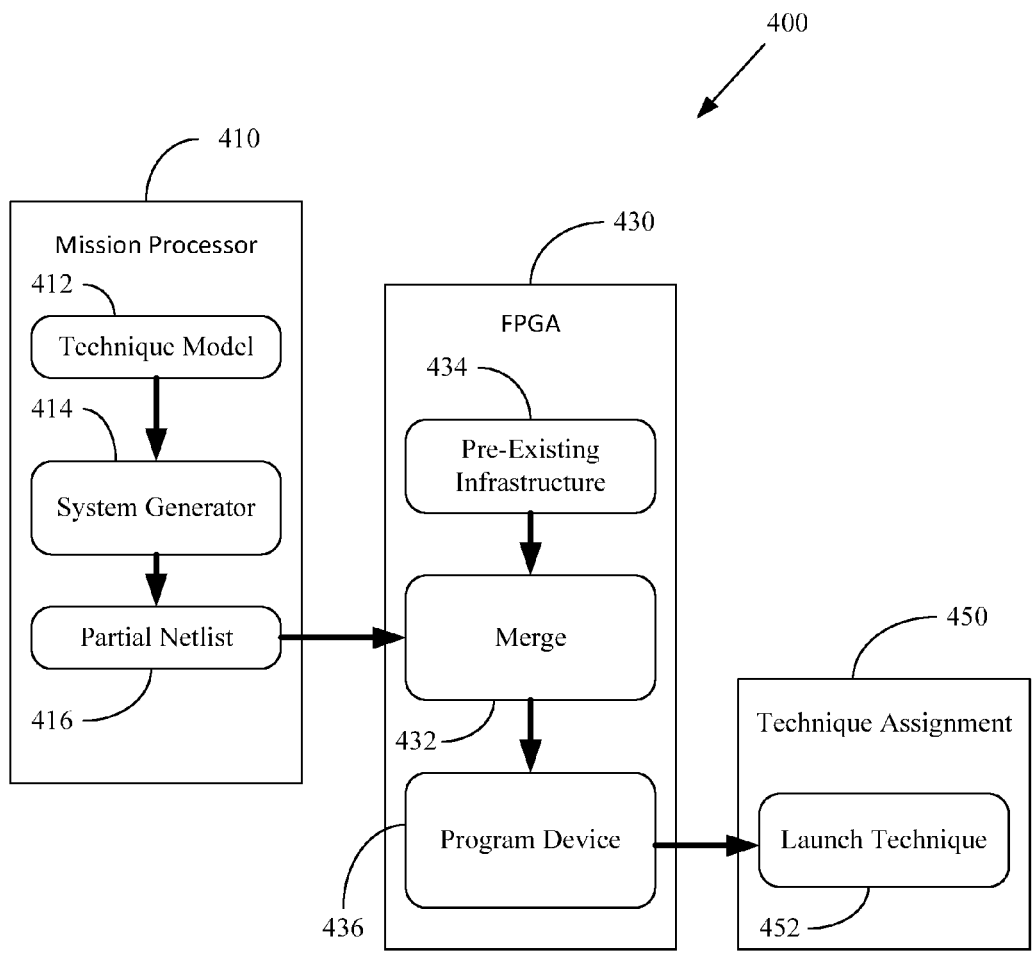
FIG. 4 illustrates a dynamic reconfigurable design flow according to an embodiment.

FIG. 4 illustrates a dynamic reconfigurable design flow 400 according to an embodiment. In FIG. 4, the mission processor 410 includes technique models 412. The technique models 412 are provided to a system generator 414. The system generator 414 creates a partial net list 416 based on the technique models 412. The partial netlist 416 includes parameters for techniques that are provided to a merge module 432 in the FPGA 430. Pre-existing infrastructure 434, i.e., techniques, may also be merged. The merged list of frequencies and other parameters are provided to a program device 436. The program device 436 provides the techniques to a launch model 452 in the technique assignment module 450, wherein the frequencies and other parameters may be added for program waveform assignments while other hardware channels are still operating.

Figure 5:
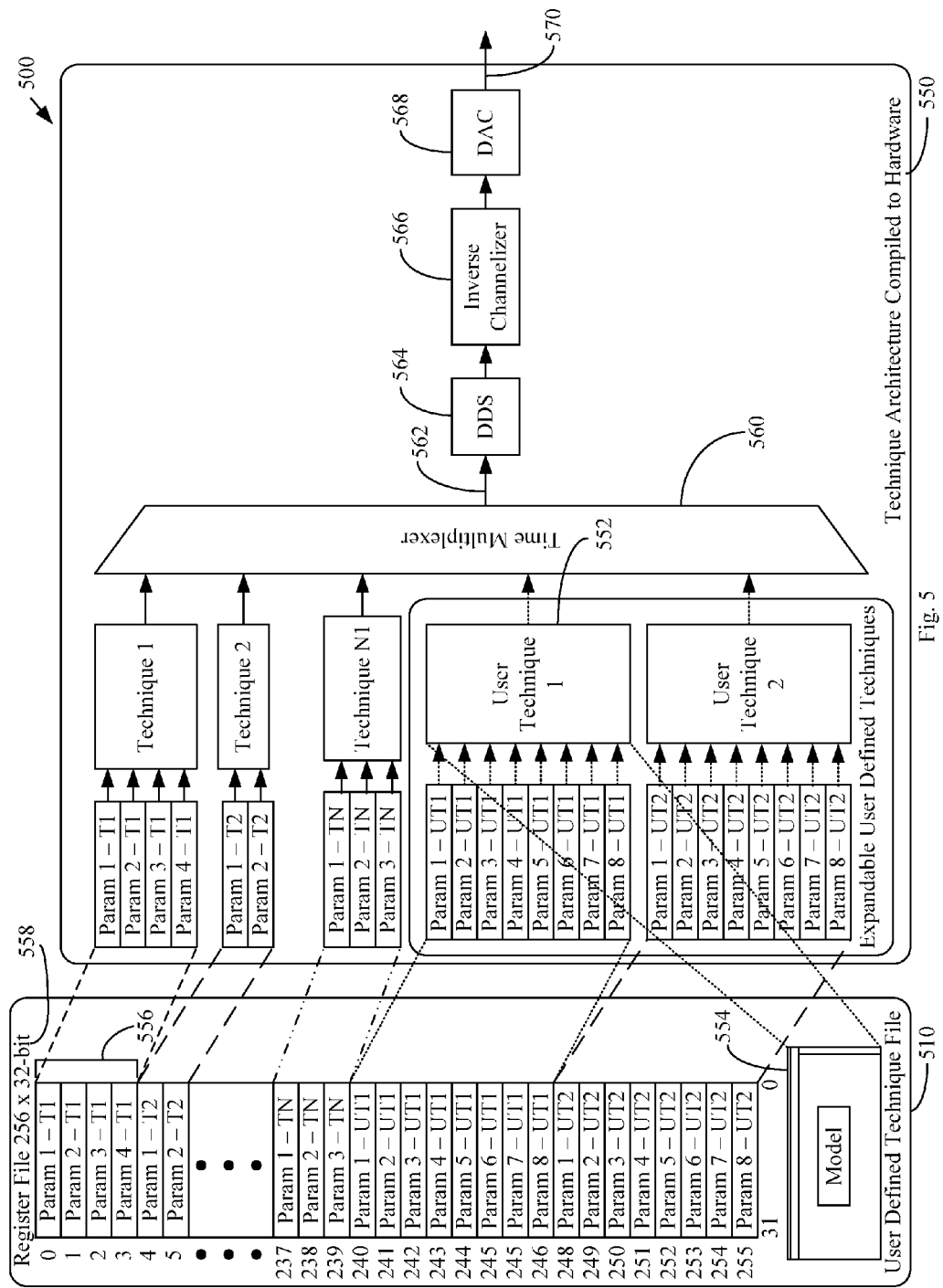
FIG. 5 illustrates a built-in modular architecture for swapping in new technique according to an embodiment.

FIG. 5 illustrates a built-in modular architecture 500 for swapping in new technique according to an embodiment. In FIG. 5, user defined technique files 510 are provide to a technique architecture 550 for compiling to hardware. Models 554 that are created by the user may be used to generate user techniques, e.g., user technique 1 552. Techniques, e.g., T1 556, from a register file 558 are also provided to the technique architecture 550 for compiling to hardware. The techniques are then multiplexed at a time multiplexer 560. Time multiplexer 560 may be used to perform time-division multiplexing between the techniques used to generate radio frequency (RF) signals to select a time varying sequence of tap outputs. The multiplexed techniques 562 are provided as input to a direct digital synthesizer (DDS) 564. The DDS provides output signals to an inverse channelizer 566, which are then provided to a digital-to-analog converter 568 that produces RF output signals 570.

Figure 6:
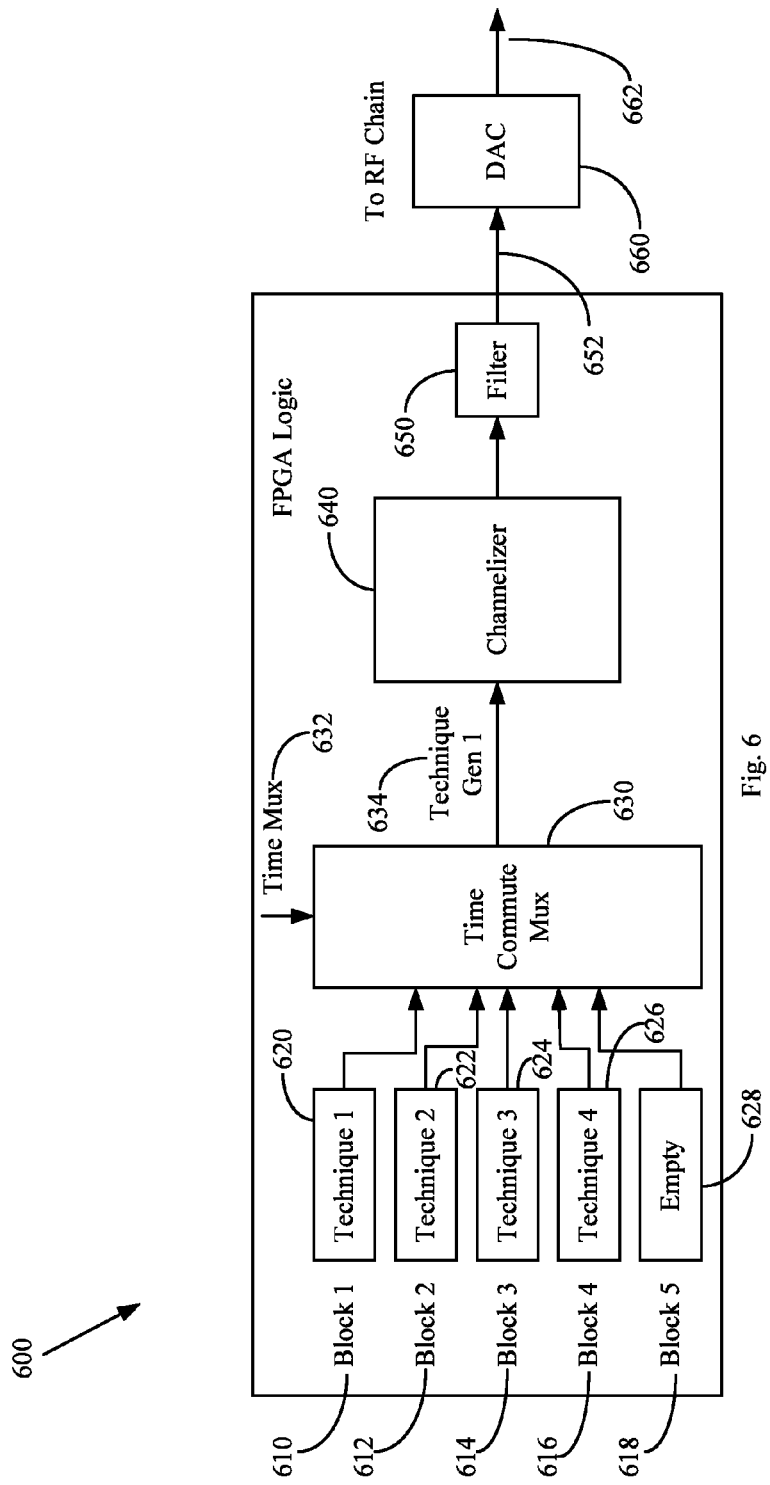
FIG. 6 illustrates a high level modular technique architecture with a particular permutation of techniques assigned to the technique user blocks according to an embodiment.

FIG. 6 illustrates a generalized rapid technique generation (RTG) module 600 according to an embodiment. The RTG module 600 creates a library of technique modules from which jamming, tracking, and other waveform techniques can be built. These modules represent a basis set of functions from which techniques are derived. This allows refactoring of existing modules within the RTG programming environment to quickly create new techniques. The functionality of these library modules is parameterized at run time and the modules can accept new parameters in real time to update technique characteristics such as center frequency, spot-width, and others to respond to threats in real time.

A data flow graph (DFG) representation may be used to build the techniques, where the basis set of library modules act as nodes. Connectors to combine modules to form more complex functionality represent the edges of the graph. This graphical representation allows ease of usability and understanding, especially compared to textual code. The graphical DFG representation may be abstracted from the target hardware such that the RTG compiler can take existing data flow graphs and compile them to new hardware or compile them to existing hardware in different ways and in different combinations. When hardware resources are limited, such that the technique DRGs cannot be compiled to hardware in their entirety, a subset of these DRGs may be chosen to be hot-swappable onto the hardware. This capability is enabled through partial, real-time reconfigurability of hardware resources. Hot swapping DFGs is allows more DRGs to be used on the FPGA that could fit within the logic and memory resources on the FPGA simultaneously.

In FIG. 6, five blocks 610-618 may provide data to multiplexer 630. FIG. 6 shows techniques 1-4 620-626 have been created for blocks 1-4 610-616. The user may commutate between multiple techniques through the time commutation switch 630. According to the time switched signal 632, the time commutation switch 630 generates a technique 634 at the input of channelizer 640. The center frequency of the techniques may be controlled through the channelizer or a single technique may be sent out on multiple different channels. In FIG. 6, the control processor has left Block 5 618 open 628. The may be done to conserve power or allow faster swapping in of a new technique. A filter 650 receives the output 642 of the channelizer 640 to ensure the technique is provided to the selected channel or channels. The filtered output 652 is provided to a DAC 660 to provide an RF signal 662 at an output according to the generated technique 634.

Partial re-configurability allows dynamic technique loading. The binary files used to map technique DFGs to hardware may be compiled pre-runtime. The binary files, once compiled, are mapped to a specific location in hardware. In other words, there is a one-to-one mapping with a technique to a binary file to a specific location in the hardware. To create a truly hot-swappable real time reconfiguration algorithm, the port mappings and amount of logic for a technique DFG may be uniform across the DRGs.

Many different combinations of DFGs and hardware may be stored to binaries. Thus, the reconfiguration algorithm may simply choose a location (and associated technique) in the hardware to be swapped out. The algorithm then chooses a technique binary available for that specific hardware and initiates the technique swap.

Figure 7:
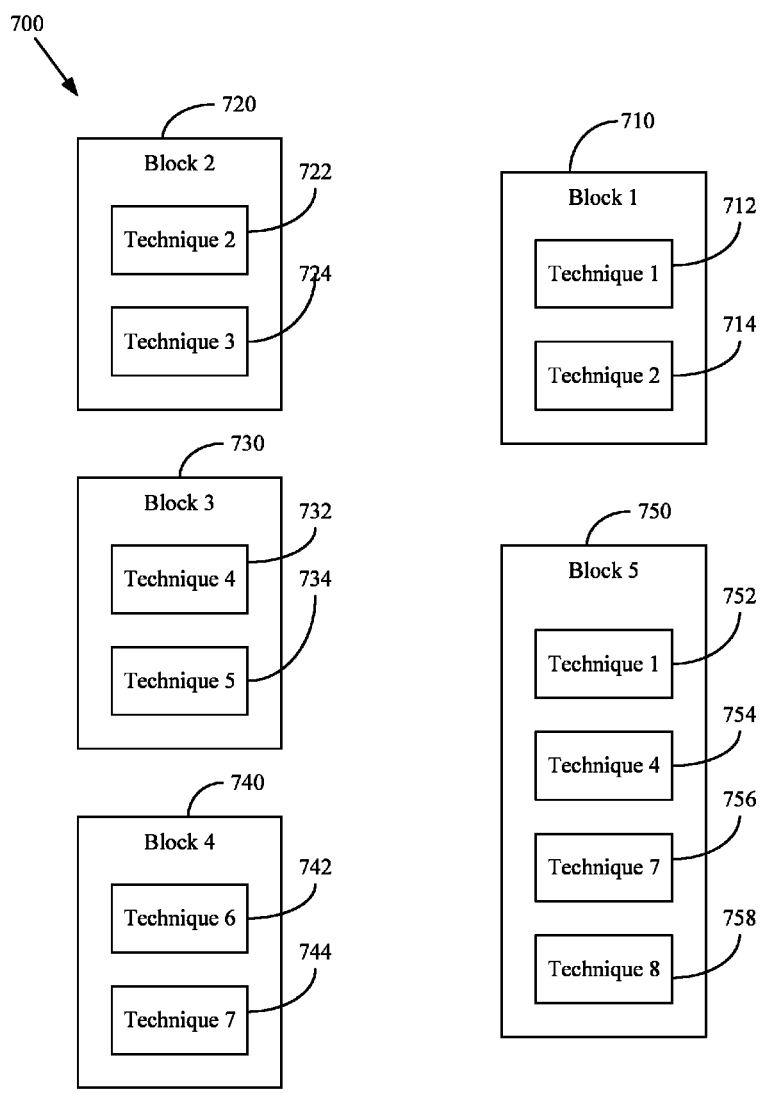
FIG. 7 illustrates organizing techniques into pre-compiled blocks allowing dynamic technique loading according to an embodiment.

FIG. 7 illustrates dynamic technique loading 700 according to an embodiment. In FIG. 7, block 1 710 includes binaries for technique 1 712 and technique 2 714. Block 2 720 includes binaries for technique 2 722 and technique 3 724. Block 3 730 includes binaries for technique 4 732 and technique 5 734. Block 4 740 includes binaries for technique 6 742 and technique 7 744. Block 5 750 includes binaries for technique 1 752, technique 4 754, technique 7 756 and technique 8 758. Accordingly, a user may create different techniques for the user blocks available in the hardware. This allows dynamic hot-swapping of techniques. Note that in Block 1 710, the user can use either technique 1 712 or technique 2 714. In Block 5 750, the user can swap in technique 1 752, technique 4 754, technique 7 756, or technique 8 758. Note this requires two different binaries stored in the library of technique 1 712, 752 since technique 1 712, 752 is mapped to two different locations, i.e., block 1 710 and block 5 750.

Figure 8:
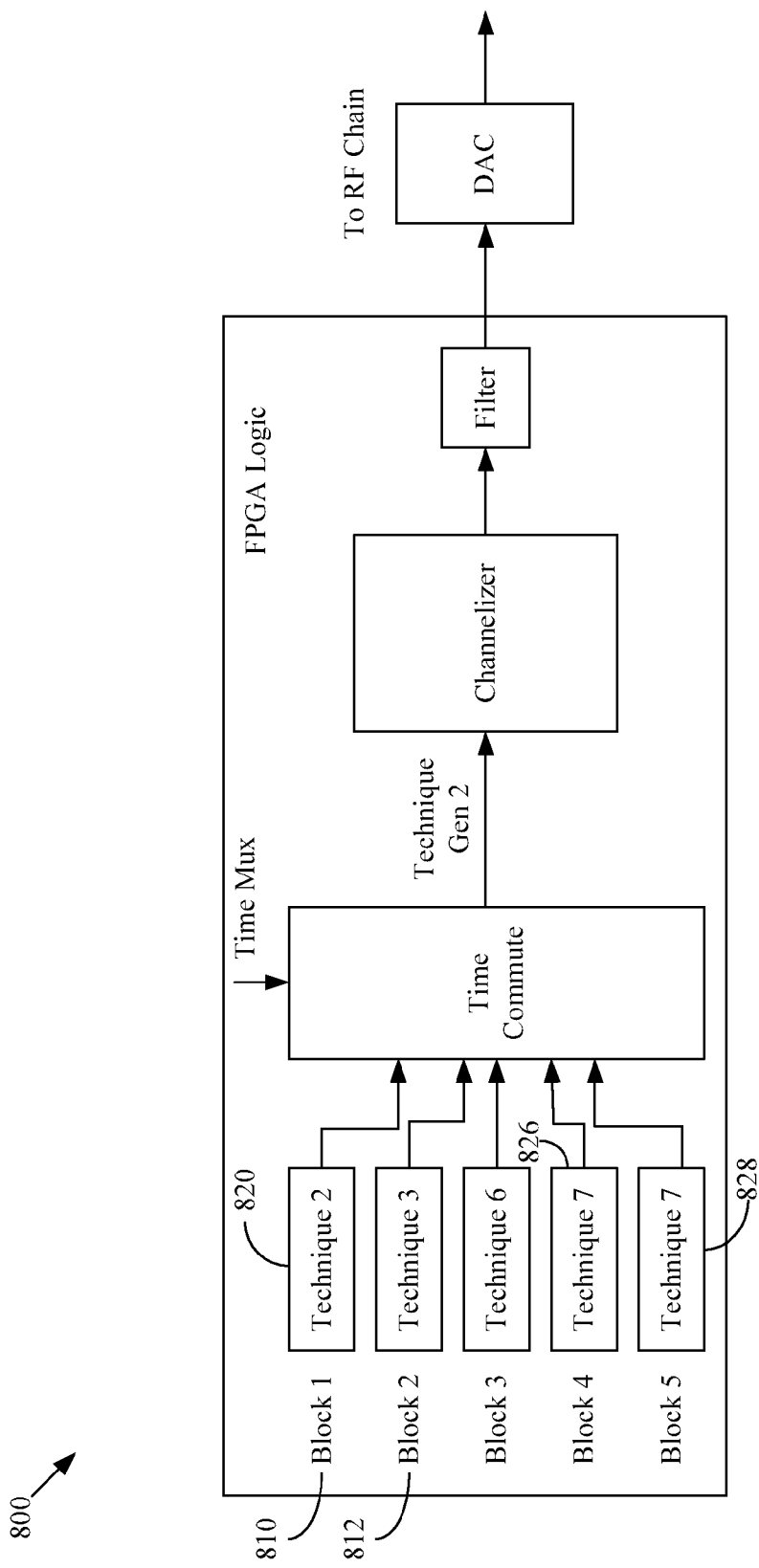
FIG. 8 illustrates a high level modular technique architecture dynamically loaded with a different permutation from FIG. 6 according to an embodiment.

FIG. 8 illustrates generalized rapid technique generation (RTG) module 800 wherein the control processor has elected to swap in a completely new set of 5 techniques. Note a binary file existed for a given technique for that specific block location as shown. Technique 2 820 is still available, although in a different location, i.e., block 1 810 instead of block 2 812. Two copies of technique 7 826, 828 have been swapped in. The control processor may want to send out technique 7 826, 828 on two different channels simultaneously or time commute between two different sets of parameters on technique 7 826, 828.

Figure 9:
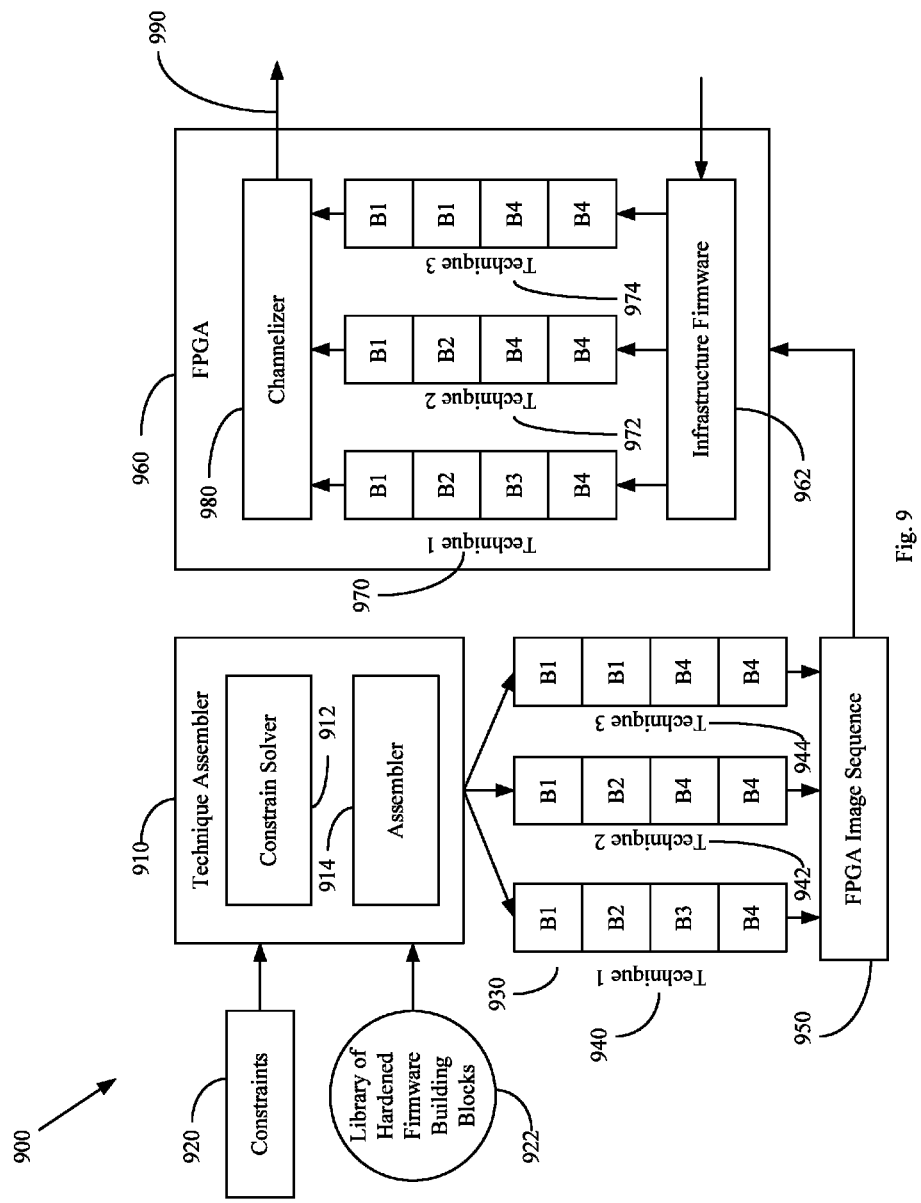
FIG. 9 illustrates a process for generating techniques using a reconfigurable technique infrastructure fabric according to an embodiment.

FIG. 9 illustrates a process for generating techniques using a reconfigurable technique infrastructure fabric 900 according to an embodiment. A technique assembler 910 includes a constraint solver 912 and assembler 914. The technique assembler 910 receives constraints 920 and firmware building blocks from a library 922. The different blocks 930 may be arranged to create different techniques, e.g., technique 1 940, technique 2 942 and technique 3 944. An FPGA image sequencer 950 provides the techniques to the FPGA 960. Infrastructure firmware 962 provides the techniques 970, 972, 974 to a channelizer 980 that channelizes encoded symbols in accordance with a sequence provided by sequence generator 950 and provides the channelized technique data is provided at an output 990.

Figure 10:
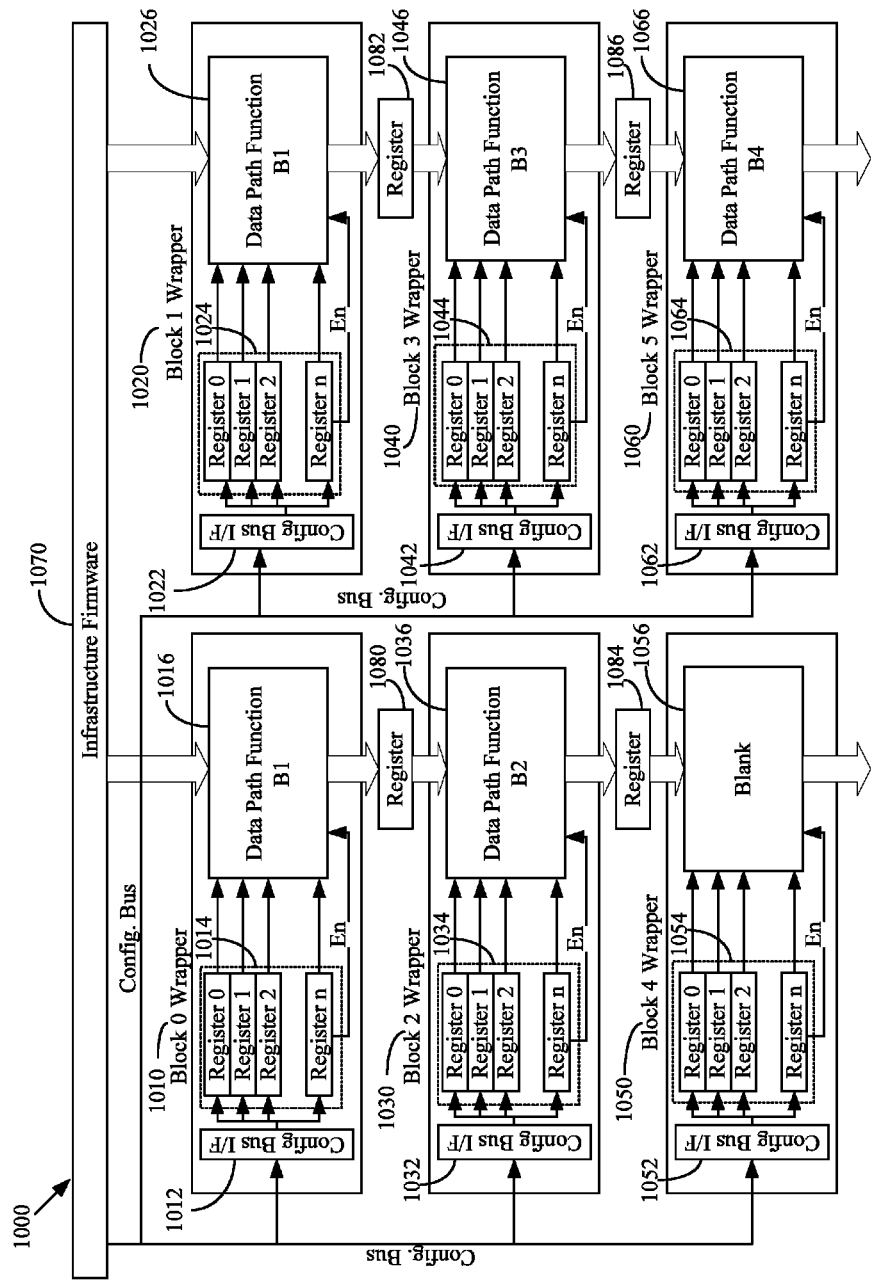
FIG. 10 illustrates a fabric block diagram according to an embodiment.

FIG. 10 illustrates a fabric block diagram 1000 according to an embodiment. The infrastructure firmware 1020 provides the techniques to block wrappers, e.g., block wrapper 0 1010, block wrapper 1 1020, block wrapper 2 1030, block wrapper 3 1040, block wrapper 4 1050, and block wrapper 5 1060. The infrastructure firmware 1020 provides configuration data to configuration buffer interfaces 1012, 1022, 1.032, 1042, 1052, 1062 for block wrappers 1010, 1020, 1030, 1040, 1050, 1060. Register data 1014, 1024, 1034, 1044, 1054, 1064 are provided to a data path functions, data path function B1 1016, 1026, data path function B2 1036, data path function B3 1046, and data path function B4 1066. A blank data path function 1056 is provided at block wrapper 4 1050. Registers 1080, 1082, 1084, 1086 buffer data between block wrappers, e.g., register 1080 buffers data between block wrapper 0 1010 and block wrapper 2 1030. Thus, a technique may be constructed through the serialized block wrappers.

Figure 11:
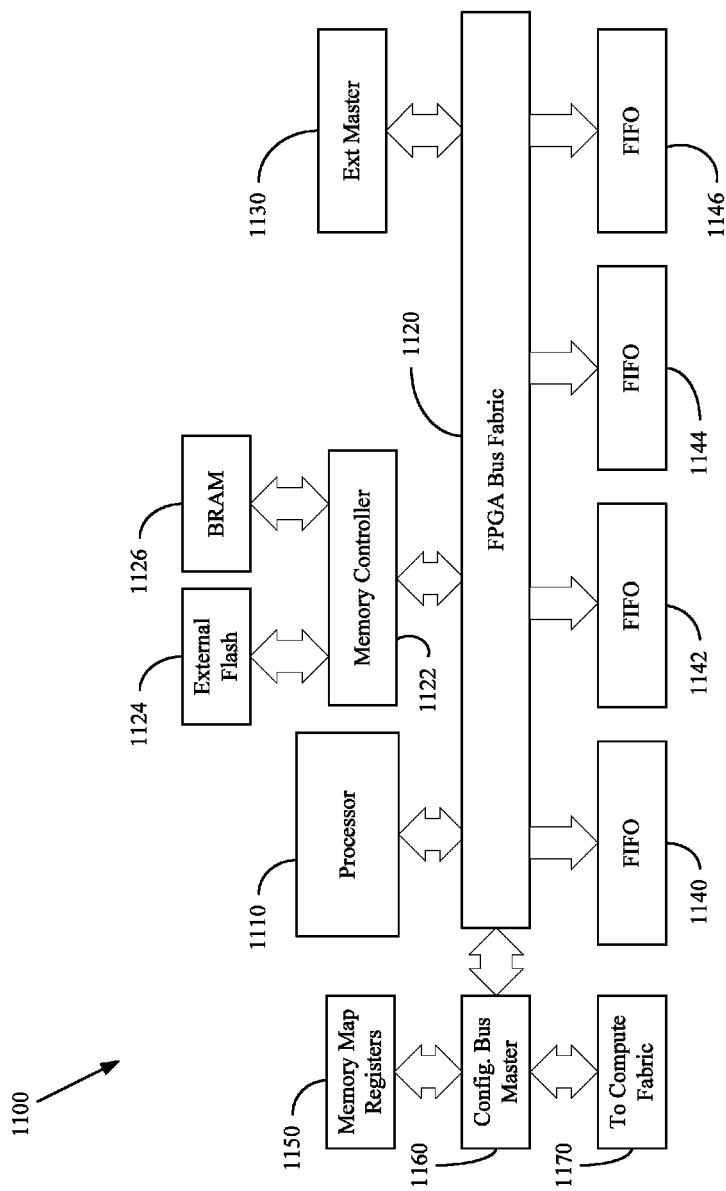
FIG. 11 illustrates a fabric configuration according to an embodiment.

FIG. 11 illustrates a fabric configuration 1100 according to an embodiment. In FIG. 11, a processor 1110 is coupled to the FPGA bus fabric 1120. A memory controller 1122 may access external flash 1124 and block random access memory (BRAM) 1126. An external master controller 1130 receives input for directing the processor 1110 to process data and move data from memory 1124, 1126 to first in, first out (FIFO) buffers 1140, 1142, 1144, 1146. Access to the data path register, e.g., coefficients, controls, etc. are provided via the memory map registers 1150 and the configuration bus master 1160. The configuration bus master 1160 may access compute fabric 1170. The data path for the fabric may provide common data path ports and automated sub-block/partition interconnect. Data is processed at the data path ports using asynchronous first in, first out (FIFO) buffering.

Figure 12:
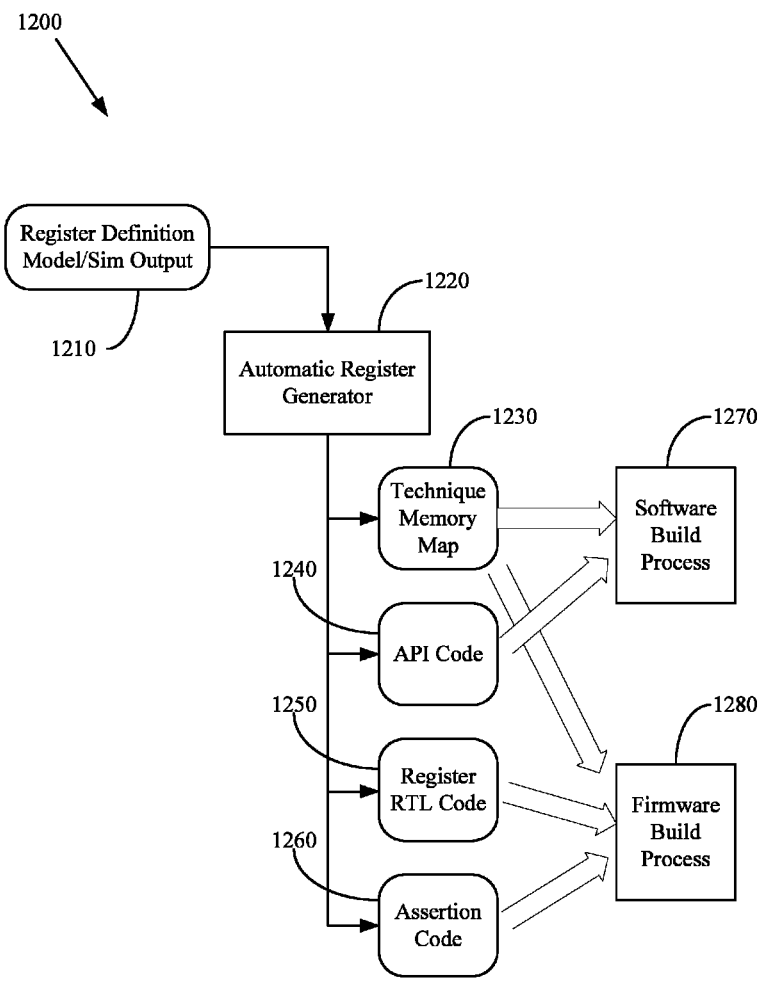
FIG. 12 illustrates flow diagram for an automated register generator according to an embodiment.

FIG. 12 illustrates flow diagram 1200 for an automated register generator according to an embodiment. Register definitions 1210 from the modeling/simulation modules are provided to the automated register generator 1220. The data from the automated register generator 1220 may be provided to a technique memory map 1230, an API code module 1240, an register transfer level (RTL) 1250 representing the register and encapsulating the data path RTL within the common interconnect and assertion code 1260, wherein assertions for RTL simulation are created. A software build process 1270 is provided input from the technique memory map 1230 and the API code 1240. A firmware build process 1280 is provided input from the technique memory map 1230, the register RTL code 1250 and the assertion code 1260.

Figure 13:
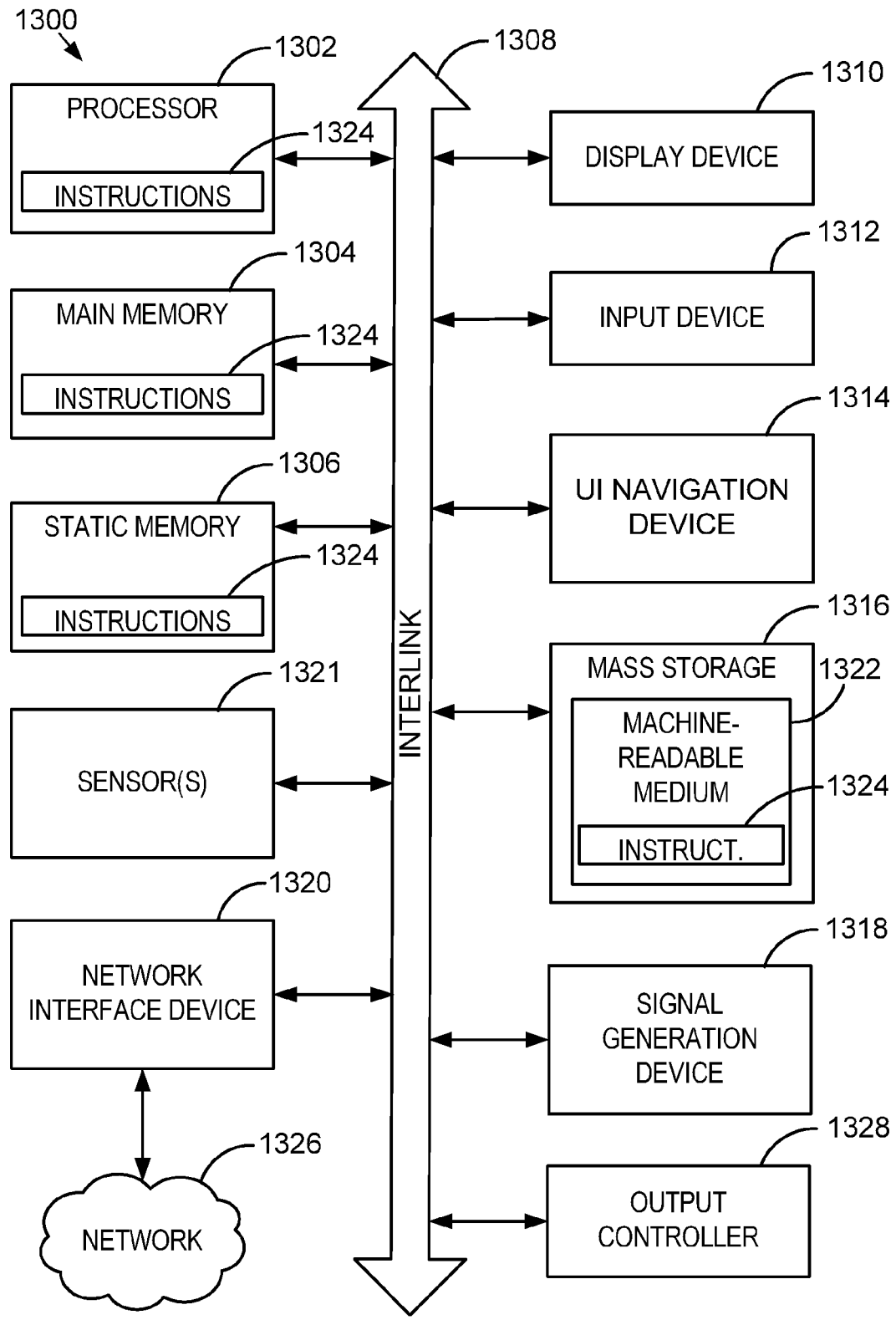
FIG. 13 illustrates a block diagram of an example machine for providing runtime creation, assignment, deployment and updating of arbitrary radio waveform techniques for a radio waveform generation device according to an embodiment.

FIG. 13 illustrates a block diagram of an example machine 1300 for providing runtime creation, assignment, deployment and updating of arbitrary radio waveform techniques for a radio waveform generation device according to an embodiment upon which any one or more of the techniques (e.g., methodologies) discussed herein may perform. In alternative embodiments, the machine 1300 may operate as a standalone device or may be connected (e.g., networked) to other machines. In a networked deployment, the machine 1300 may operate in the capacity of a server machine and/or a client machine in server-client network environments. In an example, the machine 1300 may act as a peer machine in peer-to-peer (P2P) (or other distributed) network environment. The machine 1300 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware capable of performing specified operations and may be configured or arranged in a certain manner. In an example, circuits may be arranged (e.g., internally or with respect to external entities such as other circuits) in a specified manner as a module. In an example, at least apart of one or more computer systems (e.g., a standalone, client or server computer system) or one or more hardware processors 1302 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 1302 configured using software; the general-purpose hardware processor may be configured as respective different modules at different times. Software may accordingly configure a hardware processor, for example, to constitute a particular module at one instance of time and to constitute a different module at a different instance of time. The term application, or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 1300 may include a hardware processor 1302 (e.g., a central processing unit (CPU), a graphics processing unit (GPU), a hardware processor core, or any combination thereof), a main memory 1304 and a static memory 1306, at least some of which may communicate with others via an interlink (e.g., bus) 1308. The machine 1300 may further include a display unit 1310, an alphanumeric input device 1312 (e.g., a keyboard), and a user interface (UI) navigation device 1314 (e.g., a mouse). In an example, the display unit 1310, input device 1312 and UI navigation device 1314 may be a touch screen display. The machine 1300 may additionally include a storage device (e.g., drive unit) 1316, a signal generation device 1318 (e.g., a speaker), a network interface device 1320, and one or more sensors 1321, such as a global positioning system (GPS) sensor, compass, accelerometer, or other sensor. The machine 1300 may include an output controller 1328, such as a serial (e.g., universal serial bus (USB), parallel, or other wired or wireless (e.g., infrared (IR)) connection to communicate or control one or more peripheral devices (e.g., a printer, card reader, etc.).

The storage device 1316 may include at least one machine readable medium 1322 on which is stored one or more sets of data structures or instructions 1324 (e.g., software) embodying or utilized by any one or more of the techniques or functions described herein. The instructions 1324 may also reside, at least partially, additional machine readable memories such as main memory 1304, static memory 1306, or within the hardware processor 1302 during execution thereof by the machine 1300. In an example, one or any combination of the hardware processor 1302, the main memory 1304, the static memory 1306, or the storage device 1316 may constitute machine readable media.

While the machine readable medium 1322 is illustrated as a single medium, the term "machine readable medium" may include a single medium or multiple media (e.g., a centralized or distributed database, and/or associated caches and servers) that configured to store the one or more instructions 1324.

The term "machine readable medium" may include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and compact disk-read only memory (CD-ROM) and digital versatile disk-read only memory (DVD-ROM) disks.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1300, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §172(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for providing techniques waveform parameters to a programmable device, comprising:
    a library of elements arranged to create a model describing a waveform parameter technique;
    a constraint checker arranged to verify the created model is correct by construction by needing no verification after compilation, and to implement a valid programmable device build according to the waveform parameter technique;
    a placement decision module arranged to receive the verified models and to produce a placement decision for placing the waveform parameter technique based on the verified model in a programmable device;
    a synthesis tool arranged to receive the verified model from the placement decision module and to synthesize the waveform parameter technique based on the verified model;
    a link/loader arranged to receive the placement decision from the placement decision module and to receive the synthesized technique from the synthesis tool, the link/loader further arranged to place the waveform parameter technique in the programmable device according to the placement decision.

2. The system of claim 1 further comprising a rapid technique generator (RTG) tool arranged to create a library of technique modules for building the waveform parameter technique.

3. The system of claim further comprising memory addressing for storing metadata parameters such that a given waveform parameter technique can recall its associated parameters after compile-time.

4. The system of claim 1 further comprises:
    a processor arranged to provide waveform parameter technique models having parameters for generating waveforms;
    system generator, coupled to a mission processor, the system generator arranged to receive the waveform parameter technique models and to create a partial netlist of techniques;
    a merge software module, coupled to the system generator, the merge software module arranged to receive and merge the partial netlist of waveform parameters techniques with pre-existing infrastructure waveform parameters techniques to form a merged list of waveform parameters techniques for generating waveforms; and
    a technique assignment module, coupled to the merge module, the technique assignment module arranged to receive the merged list of waveform parameters techniques, the technique assignment module further arranged to program waveform assignments while other waveform assignments are operating.

5. The system of claim 1 further comprises:
    a technique assembler, the technique assembler further including a constraint solver arranged to receive constraints from a constraint database and an assembler arranged to receive waveform parameter technique building blocks from a library of waveform parameter technique building blocks, the assembler further arranged to receive constraints for the received waveform parameter technique building blocks and to arrange the blocks to produce waveform parameters techniques therefrom;
    an image sequencer, for providing the produced waveform parameters techniques to the programmable device for implementing the waveform parameters techniques to produce waveforms according to the waveform parameters techniques.

6. The system of claim 1 further comprising an application programming interface for a waveform infrastructure, the application programming interface including:
    at least one waveform parameter technique for producing a waveform based on metadata associated with the at least one waveform parameter technique;
    a plurality of services arranged to produce electronic attack (EA) waveforms based on the at least one waveform parameter technique; and
    a technique application abstraction layer, disposed between the plurality of services and the at least one waveform parameter technique, the technique application abstraction layer arranged to receive and delegate service requests to appropriate services to support a technique engine and to provide communication between applications accessing the at least one waveform parameter technique and the plurality of services.

7. The system of claim 6, wherein the services include at east one selected from a group consisting of:
    a direct digital synthesizer (DDS) service arranged to produce a waveform based on waveform metadata;
    a digital radio frequency memory (DRFM) service arranged to create a coherent duplicate of a received signal for retransmission with modified parameters based on waveform metadata;
    a frequency modulated (FM) modulator service arranged to vary a frequency of a carrier wave for a signal based on waveform metadata;

a phase modulated (PM) modulation service arranged to vary a phase of a carrier wave for a signal based on waveform metadata;

an amplitude modulated (AM) modulation service arranged to vary an amplitude of a carrier wave for a signal based on waveform metadata;

a channelizer service arranged to extract independent communication channels from digitized RF signals;

a reconstructer service arranged to reconstruct a data stream representing a RF signal having multiple channels by combining independent communication channels; and a message passer service arranged to forward a message.

8. The system of claim 6, wherein the technique application abstraction layer isolates application programs from the firmware layer, provides inter-process communications and interprocess isolation to prevent actions of an application program executing in one program area does not affect an independent program executing in another program area.

9. The system of claim 8 further comprising predefined program areas into which an application program may be stored, the predefined program areas providing interprocess isolation.

10. The system of claim 9, wherein an application program may occupy more than one predefined program area.

11. A method for producing radio waveform parameters techniques and dynamically loading them, comprising:

receiving a list of metadata associated with at least one waveform parameter technique for creating a waveform;

providing linkable modules for implementing the at least one waveform parameter technique;

providing an indirect memory architecture for the linkable modules, the indirect memory architecture arranged to provide metadata to the linkable modules;

dynamically configuring waveform assignments onto a programmable device while other hardware channels on the programmable device are still running; and retrieving, by the linkable modules, the metadata associated with the at least one waveform parameter technique; and generating, by the linkable modules, a waveform based on the retrieved metadata associated with the at least one waveform parameter technique.

12. The method of claim 11, wherein the receiving the list of metadata comprises information for describing the waveform as a function of time.

13. The method of claim 12, wherein the receiving the metadata comprises receiving metadata and updates to metadata in real time.

14. The method of claim 11, wherein the at least one waveform parameter comprises frequency, phase, and amplitude as a function of time.

* * * * *

UNITED STATES PATENT AND TRADEMARK OFFICE
CERTIFICATE OF CORRECTION

PATENT NO. : 9,582,265 B2  
APPLICATION NO. : 15/049801  
DATED : February 28, 2017  
INVENTOR(S) : Marr, Jr. et al.

Page 1 of 2

It is certified that error appears in the above-identified patent and that said Letters Patent is hereby corrected as shown below:

In the Specification

In Column 1, Line 50, delete "permutations," and insert --permutations.-- therefor In Column 5, Line 6, delete "RE" and insert --RF-- therefor In Column 5, Line 19, delete "n" and insert --in-- therefor In Column 5, Line 19, delete "312," and insert --310,-- therefor In Column 5, Line 30, delete "net list" and insert --netlist-- therefor In Column 6, Line 15, delete "DRGs" and insert --DFGs-- therefor In Column 6, Line 16, delete "DRGs" and insert --DFGs-- therefor In Column 6, Line 19, after "DFGs", delete "is"

In Column 6, Line 19, delete "DRGs" and insert --DFGs-- therefor

In Column 6, Line 46, delete "DRGs." and insert --DFGs.-- therefor

In Column 7, Line 36, delete "1.032," and insert --1032,-- therefor

In Column 7, Line 38, after "functions,", insert --e.g.,--

In Column 8, Line 37, delete "hardware" and insert --hardware)-- therefor

In Column 8, Line 42, delete "apart" and insert --a part-- therefor

Signed and Sealed this  
First Day of May, 2018

Andrei Iancu  
*Director of the United States Patent and Trademark Office*

CERTIFICATE OF CORRECTION (continued)
U.S. Pat. No. 9,582,265 B2

In Column 11, Line 19, delete "172(b)" and insert --1.72(b)-- therefor

In the Claims

In Column 11, Line 64, in Claim 3, delete "claim" and insert --claim 1-- therefor In Column 12, Line 58, in Claim 7, delete "east" and insert --least-- therefor